Oct. 7, 1952  J. MARZIANI  2,612,850
FORMING HEAD FOR BREAD ROLL MACHINES
Filed April 17, 1948
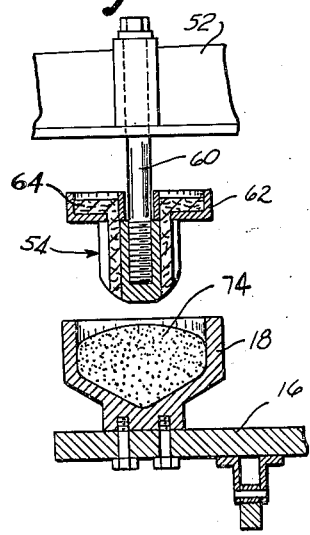
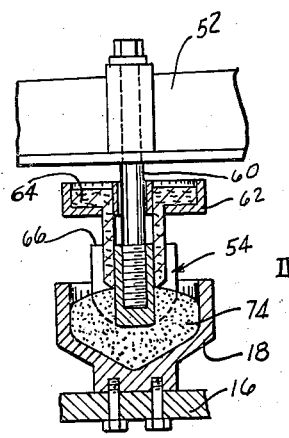
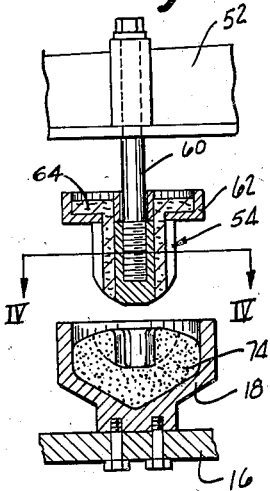
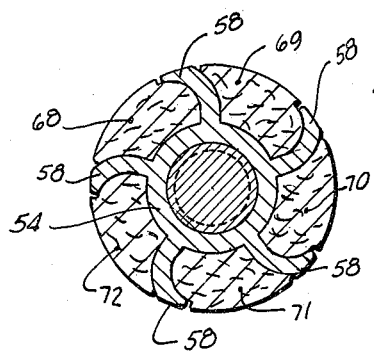
Joseph Marziani
INVENTOR
By Louis Necho
ATTORNEY
WITNESS
George A. Berardi Patented Oct. 7, 1952

2,612,850

UNITED STATES PATENT OFFICE 2,612,850

FORMING HEAD FOR BREAD ROLL MACHINES

Joseph Marziani, Philadelphia, Pa.

Application April 17, 1948, Serial No. 21,578

2 Claims. (Cl. 107—8)

In bread roll making machines, a number of lumps of dough are placed in cups and forming heads having the desired design thereon are brought to bear on the lumps of dough to impart the desired design thereto. The type of machine referred to is exemplified in the Hess Patent No. 2,174,658 of October 3, 1939.

The stamping heads of a machine of this type tend to stick to the dough and, to overcome this difficulty, it has heretofore been proposed to lubricate the stamping heads.

The object of my invention is to produce improved means for lubricating the stamping heads referred to.

In the drawing:

Fig. 1 is a fragmentary view, partly in section and partly in elevation, showing one stamping head in its raised position.

Fig. 2 is similar to Fig. 1 but showing the head in its lower, dough-contacting position.

Fig. 3 is similar to Figs. 1 and 2 showing the impression made on a lump of dough by the stamping head.

Fig. 4 is a section on line 4—4 on Fig. 3.

In the drawing 16 is a portion of an endless conveyor which is propelled from left to right, as viewed in the drawing, so as to bring a cup, or a series of aligned cups 18, each of which contains a lump of dough 74, into vertical registration with the stamping head or heads.

The endless conveyor and the means for propelling it may be conventional and therefore are not shown or described in detail.

The stamping head is formed of a head 54 having curved flutings 58 so that when it is thrust into a lump of dough, it imparts to the dough the appearance of a roll. The stamping head is secured to the lower end of a rod 60 which is carried by a bar or the like 52. The bar 52 is moved up and down, to the positions shown in Figs. 1 and 2, by means of any suitable conventional mechanism which forms no part of the invention and is therefore not shown nor described. It is sufficient to say that when a cup 18 is brought into registration with a stamping head, the bar 52 is lowered to the position of Fig. 2 to force the stamping head into the dough whereupon the bar 52, the rod 60 and head 54 are raised to the position of Fig. 3.

In order to prevent the dough from sticking to the stamping heads, I provide means for keeping the stamping heads sufficiently, but not excessively, lubricated.

To this end, I provide a dished member 62 which is freely slidable on rod 60 between the stamping head 54 and the bar 52. In the dished member 62 is an oil-permeable, or wick-like member 64 provided with pendant permeable flaps 68, 69, 70, 71 and 72 which are adapted to have wiping contact with the side wall of the stamping head 54 and with the flutings 58. The permeable member 62 is saturated with a suitable, edible lubricant which seeps down into the flaps 68 to 72 without actually dripping from the lower ends of the flaps.

The flaps 68 to 72 are made sufficiently rigid and their lower ends are made blunt so that when the stamping head is lowered, the lower ends of the flaps will come in contact with the lump of dough, and as the stamping head moves down into the dough, there will be an apparent, not real, relative motion between the permeable member and the rod 60. In other words, the lower ends of the flaps come to rest on the surface of the lump of dough 74 while the stamping head penetrates the dough as shown in Fig. 2. When the stamping head is raised, the opposite apparent movement takes place. This apparent relative movement causes the oil-moistened flaps to have wiping contact with the side of the stamping head 54 and with the flutings 58 thereon.

By this arrangement the surfaces of the stamping head are uniformly lubricated, which can not be done by merely dripping oil onto the surface of the stamping head. Also, the wiping action of the flaps against the surface of the stamping head insures against the possibility of a drop of oil falling onto the lump of dough 74.

What I claim is:

1. A lubricating device for the roll forming head of a bread-making machine in which said head is carried at the lower end of a vertically reciprocating rod, said device including a lubricant-permeable member mounted on said rod above said head and freely movable relative to said head and a lubricant-permeable extension depending from said member and adapted, when said rod is moved relative to said member, to have wiping contact with the surface of said head.

2. The structure recited in claim 1 in which said member has an opening therein through which said rod freely passes and in which a plurality of pendant extensions are carried by said member and are adapted to surround the vertical sides of said head.

JOSEPH MARZIANI.

REFERENCES CITED

The following references are of record in the file of this patent:

UNITED STATES PATENTS

| Number | Name | Date |
|---|---|---|
| 1,319,370 | Wolff | Oct. 21, 1919 |
| 2,174,658 | Hess | Oct. 3, 1939 |

FOREIGN PATENTS

| Number | Country | Date |
|---|---|---|
| 56,774 | Austria | Dec. 10, 1912 |
| 442,452 | Germany | Mar. 31, 1927 |
| 449,278 | Germany | Aug. 25, 1927 |
| 451,647 | Germany | Oct. 31, 1927 |
| 457,475 | Germany | Mar. 17, 1928 |